3,297,478
ELECTRICAL CABLES INSULATED WITH POLYETHYLENE STABILIZED WITH A p-PHENYLPHENOL FORMALDEHYDE CONDENSATION PRODUCT

Hans R. Larsen, Montreal, Quebec, Canada, assignor to Union Carbide Canada Limited, Ontario, Canada, a corporation of Canada
No Drawing. Filed Dec. 27, 1963, Ser. No. 334,012
4 Claims. (Cl. 117—232)

This invention relates to stabilized polyethylene compositions suitable for use in insulating electrical cables.

In order to be effective in insulating electrical cables a material should be capable of reducing to a minimum the energy loss through itself when it is employed in this manner. The effect of the energy loss on the rest of the components of the electrical system is minimized in this manner and excessive heating of the insulation is avoided.

The loss factor of an insulating material is equal to the product of its dissipation factor and its dielectric constant. In the case of polyethylene, which is often employed in insulating electrical cables, the dielectric constant is entirely dependent on the density of the polyethylene; thus the only way the energy loss through a polyethylene insulation of a given density can be reduced, is by reducing the dissipation factor of the polyethylene.

Antioxidants and other stabilizers usually employed in polyethylene compositions are known to have an adverse effect on the dissipation factor, and hence the loss factor, of the polyethylene, causing a high energy loss when the polyethylene is employed as insulation.

Now, however, in accordance with the instant invention, it has been discovered that polyethylene compositions possessing good oxidative resistance while still maintaining a low dissipation factor can be prepared by incorporating a minor amount of a para-phenylphenol-formaldehyde resin into a normally solid polypropylene. The resin acts as an effective antioxidant for the polyethylene, and unexpectedly does not affect the dissipation factor of the polyethylene to the extent most other phenolic resins or other antioxidants do. This makes the polyethylene so stabilized especially suitable for use in insulating submarine telephone cables where a high energy loss is particularly undesirable.

The para-phenylphenol-formaldehyde resin is incorporated into the polyethylene according to the instant invention by heating the polyethylene to a fluid plastic state while mixing with the additive, for example, by subjecting the polyethylene to the action of a heated Banbury mixer, or heated mixing rolls, or heated extruders, whereby the additives readily disperse homogeneously in the melted polyethylene. The para-phenylphenol-formaldehyde resin is suitably added in an amount of from about 0.005 percent by weight to about 0.2 percent by weight, preferably from about 0.02 percent by weight to about 0.1 percent by weight, based on the weight of the polyethylene. This resin is, of course, the well known acid or alkaline catalyzed condensation product of para-phenylphenol and formaldehyde. The polyethylene preferably has a melt index of less than 5 dg./min.

The polyethylene compositions produced by the addition of the para-phenylphenol-formaldehyde resin can be readily extruded to form the primary insulation of electrical cables, particularly submarine telephone cables.

The following examples are set forth for purposes of illustration so that those skilled in the art may better understand this invention and it should be understood that they are not to be construed as limiting this invention in any manner. The testing techniques referred to in the examples and throughout the specification, are as follows:

Density—ASTM Method D-1248-60T.
Melt Index—ASTM Method D-1238-62T, Condition E.
Dissipation Factor—ASTM Method D-1531-61.

Example I

A normally solid polyethylene (density=0.921 gram/cc. melt index=0.09 dg./min.) was hot compounded in a No. 0 Bolling mixer at a temperature of 135° C. for 6 minutes with 0.1 percent by weight, based on the weight of the polyethylene, of a commercial acid catalyzed, drying oil-soluble, resinous condensation product of para-phenylphenol and formaldehyde (softening point=102° C., specific gravity=1.23 at 20° C.). The resulting blend was compression molded into a plaque about 50 mils thick at a temperature of 180° C. The plaque was tested to determine its dissipation factor which was found to be $0.79 \times 10^{-4}$ at 100 kc./sec. A plaque prepared in the identical manner but without the para-phenylphenol-formaldehyde resin had a dissipation factor of $0.57 \times 10^{-4}$ at 100 kc./sec.

When 0.1 percent by weight of a para-tertiary-amylphenol-formaldehyde resin (softening point=90° C., specific gravity=1.05 at 20° C.) was substituted for the para-phenylphenol-formaldehyde resin, the resulting plaque had a dissipation factor of $1.75 \times 10^{-4}$ at 100 kc./sec. When 0.1 percent by weight of a para-tertiary-butylphenol-formaldehyde resin (softening point=124° C., specific gravity=1.04 at 20° C.) was employed, the resulting plaque had a dissipation factor of $1.00 \times 10^{-4}$ kc./sec.

Example II

A normally solid polyethylene (density=0.920 gram/cc., melt index=0.3 dg./min.) was hot compounded in a Banbury mixer at a temperature of 135° C. for 6 minutes with 0.01 percent by weight, based on the weight of the polyethylene, of the para-phenylphenol-formaldehyde resin described in Example I. The resulting blend was compression molded into plaques about 20 mils thick at a temperature of 180° C.

The plaques were suspended in a circulating-air oven maintained at a temperature of 170° C., and removed at regular intervals and examined by infrared spectroscopy to determine the oxidation of the polyethylene. The time in hours for the resin to develop 0.006 abs./mil carbonyl was taken as the induction period. This was found to be 2 hours.

When 0.01 percent by weight of the para-tertiary-amylphenol-formaldehyde resin described in Example I was substituted for the para-phenylphenol-formaldehyde resin, the induction period was found to be 1 hour.

When 0.01 percent by weight of the para-tertiary-butylphenol-formaldehyde resin described in Example I was substituted for the para-phenylphenol-formaldehyde resin, the induction period was found to be 1 hour.

What is claimed is:

1. An electrical cable insulated with a normally solid polyethylene blended with from about 0.005 percent by weight to about 0.2 percent by weight, based on the weight of the polyethylene, of the resinous condensation product of para-phenylphenol and formaldehyde.

2. An electrical cable insulated with a normally solid polyethylene blended with from about 0.02 percent by weight to about 0.1 percent by weight, based on the weight of the polyethylene, of the resinous condensation product of para-phenylphenol and formaldehyde.

3. An electrical cable insulated with a normally solid polyethylene having a melt index of less than 5 dg./min. blended with from about 0.005 percent by weight to about 0.2 percent by weight, based on the weight of the polyethylene, of the resinous condensation product of para-phenylphenol and formaldehyde.

4. An electrical cable insulated with a normally solid polyethylene having a melt index of less than 5 dg./min. blended with from about 0.02 percent by weight to about 0.1 percent by weight, based on the weight of the polyethylene, of the resinous condensation product of para-phenylphenol and formaldehyde.

References Cited by the Examiner

UNITED STATES PATENTS 3,234,176   2/1966   Bata et al. _____ 260—848

FOREIGN PATENTS 877,128   9/1961   Great Britain.

MURRAY TILLMAN, *Primary Examiner.*

J. C. BLEUTGE, *Assistant Examiner.*